July 16, 1957     K. H. SCHULTZE     2,799,178
APPARATUS TO CORRECT OR COMPENSATE IRREGULARITIES
OF THE PITCH OF GUIDE SCREWS
Filed May 18, 1956     2 Sheets-Sheet 1
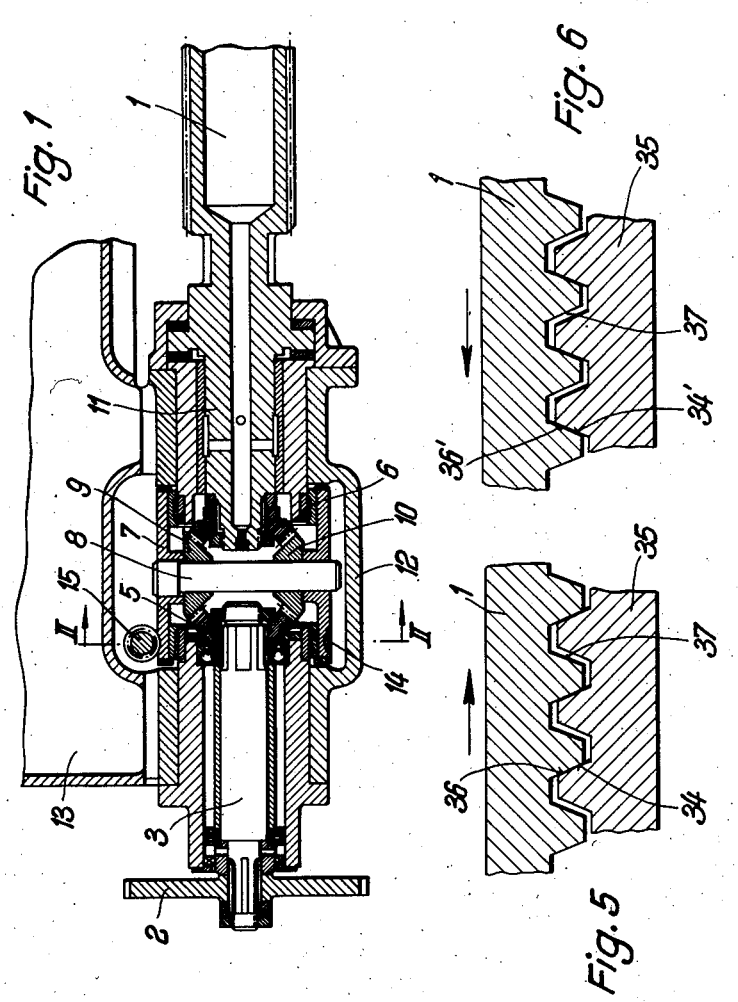
Kurt H. Schultze
Inventor:
ATTORNEY

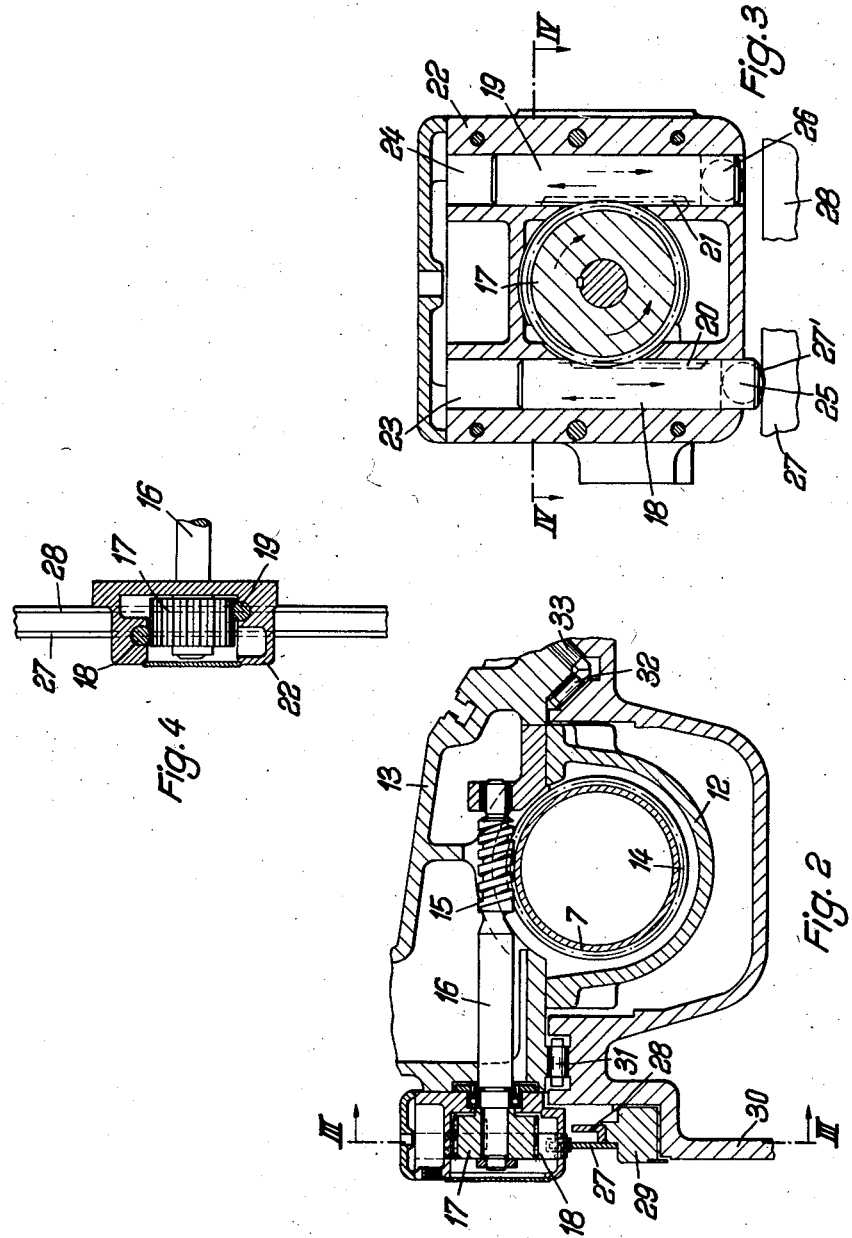

United States Patent Office 2,799,178
Patented July 16, 1957

2,799,178
APPARATUS TO CORRECT OR COMPENSATE IRREGULARITIES OF THE PITCH OF GUIDE SCREWS

Kurt H. Schultze, Berlin-Frohnau, Germany, assignor to Herbert Lindner G. m. b. H., Berlin-Wittenau, Germany, a corporation of Germany Application May 18, 1956, Serial No. 585,833

Claims priority, application Germany May 28, 1955

2 Claims. (Cl. 74—424.8)

My invention relates to a device for correcting or compensating irregularities in guide screws particularly of thread cutting or grinding machines.

It is known that every screw more specifically each flank of its thread, has a certain characteristic which may be represented by a curve indicating any irregularities of the pitch by deviations from a straight line and its has already been suggested to duplicate such characteristic curve upon a correction bar adapted to control a differential gearing driving the guide screw so that the same is temporarily accelerated or retarded in its rotational speed. In the known devices of said type a single correction bar has been used. Such single correction bar was either shaped according to the irregularities of one flank of the screw thread what made it efficiently useful only during the rotation of the screw in one direction, or it was shaped according to an average curve compounded of the characteristic of each flank in which case really perfect threads could not be cut or ground during the rotation of the guide screw in either direction.

It is an object of my invention to avoid the said disadvantages and to provide a device which will accurately correct or compensate any irregularities of each flank of the screw thread and which therefore may be used efficiently during both rotational movements of the guide screw.

According to my invention I use in my new device two correction bars or guide rails, each being shaped according to the characteristics of one of the two flanks of the screw thread, and two feeler pins or the like adapted to slide upon the curved surface of its respective correction bar or guide rail, such feeler pins alternately controlling the differential gear driving the guide screw during its rotational movement, in one or the other direction.

The said and other objects of my invention will be more fully understood from the following specification when read with the accompanying drawing in which one embodiment of my invention is illustrated.

In the drawing:

Fig. 1 shows a longitudinal sectional view of said embodiment,

Fig. 2 a cross sectional view along line II—II of Fig. 1,

Fig. 3 a sectional view in larger scale along line III—III of Fig. 2,

Fig. 4 a sectional top view along line IV—IV in Fig. 3, and

Figs. 5 and 6 illustrate schematically the two positions of the guide screw in its stationary nut during the rotation of the screw in clockwise and anti-clockwise direction, respectively.

The same reference numbers indicate the same or equivalent parts in all figures of the drawing.

The guide screw 1 is provided with a drive shaft 11 rotated by a drive spindle (not shown in the drawing) over an intermediate change gear (of which only the last wheel 2 is illustrated), a shaft 3 and a differential gear. The differential gear comprises two bevel gears 5 and 6 keyed upon said drive shaft 3 and upon said spindle shaft 11, respectively, and two planetary bevel gears 9 and 10 rotatably mounted upon the shaft 8 seated in the cage or drum 7. The differential gear is enclosed by a casing 12 which rotatably supports said drive shaft 11 and which is attached to the carriage or sliding table 13 of the grinding or other machine. Said carriage 13 is displacably mounted upon the machine frame 30 for example by rollers 31, 32, 33. It will be well understood that the rotation of shaft 3 will be transmitted to the guide screw shaft 11 in the ratio 1:1 as long as the cage 7 will remain stationary, whereas a transmission in a different ratio will occur when the cage 7 is being permitted to turn in one or the other direction.

The cage 7 is provided with a worm toothing 14 which engages a steep threaded, not self-locking worm gear 15 formed upon a shaft 16. A pinion 17 keyed upon said shaft 16 engages two racklike feeler pins or rods 18, 19 provided with toothings 20, 21 and slidably mounted in bores 23, 24 of the box 22 attached to said carriage 13. To safely prevent any angular dispacement the said pins 18, 19 may be provided with customary longitudinal guide means. Each of said pins 18, 19 is adapted to slidably feel with its lower tip, which may be provided with a spherical roller or ball point 25, 26, along guide rails 27, 28 respectively. The slide surface of each guide rail 27, 28 is curved in part namely provided with elevations and depressions which will rise or lower the said feeler pins 18, 19 in accordance with the error or deficiency curve of the pitch of the guide screw 1 the operation of which is to be corrected. The said guide rails 27, 28 are held by a support 29 mounted on the machine frame 30.

My device operates as follows:

Suppose the guide spindle 1 having a right-hand thread turns in the right-hand direction effecting an axial displacement of the guide spindle in the stationary spindle nut 35, and therefore also of the carriage 13 of the machine from left to right as indicated by the arrow in Fig. 5. In such case the right tooth flanks 34 of the stationary spindle nut 35 will abut the left tooth flanks 36 of the guide screw 1, whereas the opposite tooth flanks will be separated from each other by an enlarged play or backlash 37.

In case that the pitch of the screw 1 has to be corrected within a certain interval the guide rail 27 is in its respective portion provided with a negatively or positively curved surface i. e. with elevations and/or depressions causing the feeler pin 18 to rise or to descend, respectively. Fig 3 shows the feeler pin 18 sliding along a negatively curved surface portion namely the depression 27′. The descending or rising feeler pin 18 will turn the pinion 17 with shaft 16 and its worm 15 in one or the other direction, causing the gear cage 7 to turn accordingly, thus actuating the differential gears 5, 6, 9, 10 and correctively changing i. e. accelerating or retarding the rotation of the guide screw 1. This corrective change caused by the action of the differential gear will result in a faultless operation of the forward moving guide screw 1 the deficiencies of which have been compensated.

If the carriage 13 is to be returned the guide screw turns and moves in opposite axial direction as indicated by the arrow in Fig. 6; the left tooth flanks 34′ of the stationary screw nut 35 will abut against the right tooth flanks 36′ of the guide screw 1. The cage 7 in the differential gear will be slightly turned in the direction of the rotation of said guide screw 1, and the worm 15 with shaft 16 and pinion 17 will be accordingly turned as indicated by the dotted circular arrow in Fig. 3 causing the feeler pin 18 to rise from its guide rail 27 and the feeler pin 19 to descend upon its guide rail 19 thereby again locking said pinion 17 with the shaft 16 and the worm 15 and holding the said cage 7, which supports the planetary gears 9, 10 of the differential gear, in stationary position. The feeler pin 19 sliding on the return movement of the carriage 13 along the surface of the guide rail 28, which is correctively curved in accordance with imperfections of the pitch of the guide screw 1 as described above will rise or descend and effect temporary rotational displacements of the cage 7 with its gears 9, 10, thus actuating the said differential gear with the result that a perfect and accurate grinding or cutting of the thread in the work piece will be insured also on the return movement of the carriage 3.

While one specifice embodiment of my invention has been shown and described in detail to illustrate the application of the principles of my invention, it will be well understood that the same may be otherwise embodied without departing from such principles and without avoiding the scope of the appended claims.

What I claim as my invention is:

1. In an apparatus to correct or compensate irregularities of the pitch of guide screws particularly in thread cutting or grinding machines, the improvement comprising in combination a driven shaft rotating with the guide screw, a differential gear driving said shaft, two guide rails each having a sliding surface in respective portions positively or negatively curved in accordance with imperfections of the pitch of one flank of the guide screw, two feeler pins of which each one slides upon the said curved surface of one guide rail while the other is being held in operative position, and transfer means operated by the axially sliding feeler pin to hold the other feeler pin in said inoperative position and to actuate said differential gear to temporarily accelerate and retard, respectively, the rotation of the guide screw.

2. An apparatus to correct or compensate irregularities of the pitch of guide screws particularly in thread producing machines such as thread grinding machines, comprising in combination a driving shaft, a driven shaft rotating with the guide screw, a differential gear between these shafts, said differential gear comprising one bevel gear keyed to each of said shafts and at least one planetary gear, a rotatably mounted cage supporting said planetary gear, a worm thread on said cage, a worm wheel or spindle engaging said worm thread in a not self-locking manner, a pinion rotating with said worm wheel or spindle, two slidably mounted toothed feeler pins engaged by said pinion in diametrically opposed positions, a guide rail for each feeler pin having a sliding surface cooperating with the tip of its respective feeler pin, said sliding surface being positively and negatively curved i. e. provided with elevations and depressions in accordance with imperfections of the pitch of one flank, respectively, of the guide screw, said elevations and depressions temporarily displacing said feeler pins in harmony with said imperfections and causing the said cage with said planetary gear to turn in one or the other direction, whereby the differential gear temporarily accelerates and retards, respectively, the rotation of the guide screw.

No references cited.